United States Patent
Chen

(10) Patent No.: US 11,409,169 B2
(45) Date of Patent: Aug. 9, 2022

(54) LIQUID CRYSTAL DISPLAY PANEL AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Jiangchuan Chen, Shenzhen (CN)

(*) Notice: Subject to any disclaimer, the term of this patent is extended or adjusted under 35 U.S.C. 154(b) by 391 days.

(21) Appl. No.: 16/625,781

(22) PCT Filed: Dec. 16, 2019

(86) PCT No.: PCT/CN2019/125651
§ 371 (c)(1),
(2) Date: Dec. 23, 2019

(87) PCT Pub. No.: WO2021/109229
PCT Pub. Date: Jun. 10, 2021

(65) Prior Publication Data
US 2021/0356783 A1    Nov. 18, 2021

(30) Foreign Application Priority Data
Dec. 6, 2019   (CN) .......................... 201911243636.8

(51) Int. Cl.
*G02F 1/1347*   (2006.01)
*G02F 1/1335*   (2006.01)

(52) U.S. Cl.
CPC ...... *G02F 1/1347* (2013.01); *G02F 1/133531* (2021.01)

(58) Field of Classification Search
CPC .......................... G02F 1/1347; G02F 1/133531
See application file for complete search history.

(56) References Cited

U.S. PATENT DOCUMENTS

| | | | |
|---|---|---|---|
| 5,124,818 A | 6/1992 | Conner et al. | |
| 6,392,725 B1* | 5/2002 | Harada | G02F 1/13473 349/94 |
| 2007/0177084 A1* | 8/2007 | Ishitani | G02F 1/133528 349/96 |
| 2012/0293741 A1 | 11/2012 | Gu | |
| 2019/0121178 A1 | 4/2019 | Park | |

(Continued)

FOREIGN PATENT DOCUMENTS

| CN | 101191921 A | 6/2008 |
|---|---|---|
| CN | 102169266 A | 8/2011 |
| CN | 103698930 A | 4/2014 |

(Continued)

*Primary Examiner* — Lucy P Chien

(57) ABSTRACT

The present invention provides a liquid crystal display panel and a display device. The liquid crystal display panel includes at least two display layers arranged in a stack. Each of the display layers comprises a liquid crystal layer, each of the liquid crystal layers comprises at least one pixel region and at least one non-pixel region, wherein a total coverage area of the at least one pixel region of the at least two display layers is greater than or equal to a display area of the liquid crystal display panel, and data signals of the at least two display layers are independently controlled. The present invention may achieve higher resolution display of products by the solution mentioned above.

17 Claims, 4 Drawing Sheets

(56) References Cited

U.S. PATENT DOCUMENTS

2019/0348477 A1   11/2019   Chien et al.

FOREIGN PATENT DOCUMENTS

| CN | 104391407 A | 3/2015 |
| CN | 106154661 A | 11/2016 |
| CN | 108666351 A | 10/2018 |
| CN | 208367389 U | 1/2019 |
| CN | 109960082 A | 7/2019 |
| CN | 110441967 A | 11/2019 |

* cited by examiner

LIQUID CRYSTAL DISPLAY PANEL AND DISPLAY DEVICE

FIELD OF INVENTION

The present disclosure relates to the display technology field, and more particularly, to a liquid crystal display panel and a display device.

BACKGROUND OF INVENTION

At present, most liquid crystal display panels use progressive scanning to achieve screen refresh.

However, as resolution of liquid crystal display panels increases, especially large-sized and high-resolution products, pixel charging time is reduced, resulting in a bottleneck, preventing further improvement in pixel resolution.

SUMMARY OF INVENTION

A technical problem mainly solved by the present disclosure is to provide a liquid crystal display panel and a display device to achieve higher resolution display of products.

To achieve the above technical problem, the present disclosure uses a technical solution that providing a liquid crystal display panel. The liquid crystal display panel comprises at least two display layers arranged in a stack. Each of the display layers comprises a liquid crystal layer, and each of the liquid crystal layers comprises at least one pixel region and at least one non-pixel region. Wherein a total coverage area of the at least one pixel region of the at least two display layers is equal to a display area of the liquid crystal display panel, and data signals of the at least two display layers are independently controlled.

Wherein, positions of the at least one pixel region of the at least two display layers are complementary in a light emitting direction of the liquid crystal display panel.

Wherein, an alignment direction of liquid crystal molecules in each of the liquid crystal layers is the same.

Wherein, the at least one pixel region and the at least one non-pixel region of each of the display layers are disposed at a certain interval.

Wherein, an area of the at least one pixel region is equal to an area of the at least one non-pixel region.

Wherein, each of the display layers further comprises a first substrate, and an array layer disposed between the first substrate and the liquid crystal layer.

Wherein, the liquid crystal display panel further comprises a second substrate disposed on a side of the most upper layer of the display layers away from the array layer, a first polarizer disposed on a side of the first substrate away from the display layer, and a second polarizer disposed a side of the most bottom layer of the display layers away from the first polarizer.

Wherein, a polarization direction of the first polarizer is equal to a polarization direction of the first polarizer.

Wherein, the liquid crystal display panel further comprises a backlight module disposed on a side of the second polarizer away from the first polarizer.

To achieve the above technical problem, the present disclosure uses another technical solution that providing a display device. The display device comprises a liquid crystal display panel mentioned above.

Advantageous effects of the present disclosure are different from the prior art. The present disclosure adopts at least two display layers arranged in a stack, and data signals of the at least two display layers are independently controlled. Therefore, pixel charging time of each of the display layers may be longer, which increases resolution limit of the liquid crystal display panel.

DESCRIPTION OF DRAWINGS

In order to more clearly illustrate the technical solutions of the embodiments of the present invention, the drawings used in the description of the embodiments will be briefly described as below. Obviously, the drawings described as below are just some embodiments of the present invention. For one of ordinary skill in the art, under the premise of no creative labor, other drawings can also be obtained according to these drawings.

DETAILED DESCRIPTION OF PREFERRED EMBODIMENTS

Figure 1:
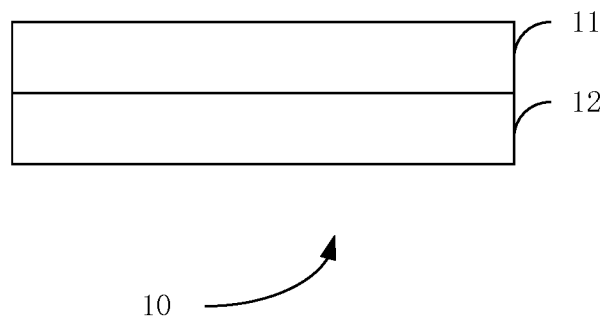
FIG. 1 is a schematic structural diagram of a first embodiment of a liquid crystal display panel provided by the present disclosure.

The technical solutions in the embodiments of the present disclosure will be clearly and completely described below in conjunction with the accompanying drawings in the embodiments of the present disclosure. Obviously, the embodiments described are merely a part of the present disclosure, rather than all the embodiments. All other embodiments obtained by the person having ordinary skill in the art based on embodiments of the disclosure, without making creative efforts, are within the scope of the present disclosure.

In the present disclosure, it should be understood that the orientation or positional relationship of terms, such as "center", "up", "down", "left", "right", "vertical", "horizontal", "inside", "outside", etc. is based on the orientation or positional relationship shown in the drawings. The above orientations or positional relationships are merely for the purpose of describing the present disclosure and simplifying the description, and do not indicate or imply that the device or component referred to must have a specific orientation, constructed and operated in a specific orientation. Therefore, it should not be construed as limiting the invention. In addition, the terms "first", "second", and "third" are used for descriptive purposes only and should not be interpreted as indicating or implying relative importance.

In the present disclosure, the terms "mounting", "connected", "fixed" and the like should be broadly understood unless expressly stated or limited otherwise. For example, it may be fixed connected, removably connected, or integrated; it may be mechanically connected, or an electrically connected; it may be directly connected, or indirectly connected through an intermediary; it may be a connection between two elements or an interaction between two elements. For those skilled in the art, the specific meanings of the above terms in the present disclosure may be understood based on specific situations.

Figure 2A:
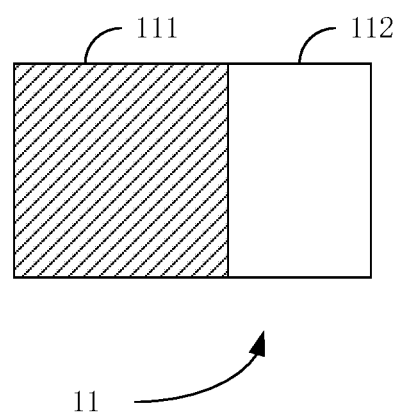
FIG. 2a is a schematic structural diagram of a first embodiment of a liquid crystal layer included in one of at least two display layers of a liquid crystal display panel provided by the present disclosure.
Figure 2B:
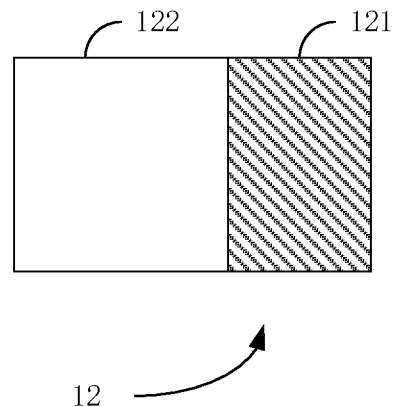
FIG. 2b is a schematic structural diagram of a first embodiment of a liquid crystal layer included in the other one of at least two display layers of a liquid crystal display panel provided by the present disclosure.
Figure 3:
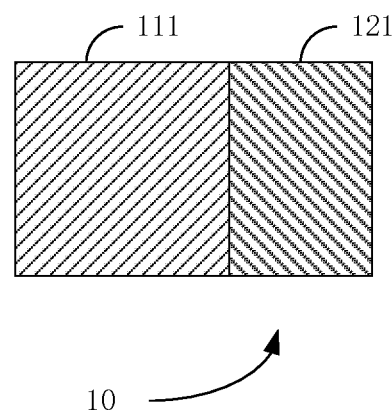
FIG. 3 is a schematic top view of a first embodiment of a liquid crystal display panel provided by the present disclosure.

Referring to FIG. 1, FIG. 1 is a schematic structural diagram of a first embodiment of a liquid crystal display panel provided by the present disclosure. The present disclosure provides a liquid crystal display panel 10 comprising two display layers, display layer 11 and display layer 12 disposed in a stack. The display layer 11 and the display layer 12 respectively comprise a liquid crystal layer. Refer to FIG. 2a, FIG. 2b and FIG. 3 in combination. FIG. 2a is a schematic structural diagram of a first embodiment of a liquid crystal layer included in one of at least two display layers of a liquid crystal display panel provided by the present disclosure. FIG. 2b is a schematic structural diagram of a first embodiment of a liquid crystal layer included in the other one of at least two display layers of a liquid crystal display panel provided by the present disclosure. FIG. 3 is a schematic top view of a first embodiment of a liquid crystal display panel provided by the present disclosure. The liquid crystal layer of the display layer 11 comprises a pixel region 111 and a non-pixel region 112, and the liquid crystal layer of the display layer 12 comprises a pixel region 121 and a non-pixel region 122. A total coverage area of the pixel region 111 of the display layer 11 and the pixel region 121 of the display layer 12 is equal to a display area of the liquid crystal display panel. Data signals of the display layer 11 and the display layer 12 are independently controlled. Because the data signals of display layer 11 and display layer 12 are separately controlled, the number of scanning lines (gate lines) is reduced by half, and turn-on time of each pixel is double.

Specifically, in the case of a liquid crystal display panel having only one display layer, for high-resolution products with a resolution of n*2m, the rough calculation formula for pixel charging time is as follows:

$T1=1/f/2m$

Wherein f is refresh frequency of the liquid crystal display panel, and 2m is the number of scanning lines.

In the present embodiment, stage-shift pixels are equally divided into the display layer 11 and the display layer 12 according to stages, and the date signals of the display layer 11 and the display layer 12 are independently controlled. The number of scanning lines of the display layer 11 and the display layer 12 both is m and corresponding to the display layer 11 and the display layer 12, and the scanning lines addressing time, that is, the pixel charging time of each of the display layers is $T2=1/f/m=2T1$. In other words, at the same refresh frequency, the pixel charging time may be double, thereby increasing resolution limit of the liquid crystal display panel 10.

In the present embodiment, the liquid crystal display panel 10 comprises two display layers, display layer 11 and display layer 12 arranged in a stack. In other embodiments, the liquid crystal display panel comprises three or more display layers arranged in a stack. According to the present embodiment mentioned above, the display layer 11 and the display layer 12 each comprises a pixel region and a non-pixel region. In other embodiments, the display layer 11 and the display layer 12 may comprise a plurality of pixel regions and a plurality of non-pixel regions.

It should be known from the above description that in the present embodiment, at least two display layers are arranged in a stack, and data signals of the at least two display layers are independently controlled. Therefore, pixel charging time of each of the display layers may be longer, which increases resolution limit of the liquid crystal display panel. A total coverage area of the pixel region included in the at least two display layers is greater than or equal to a display area of the liquid crystal display panel, which ensures that the content to be displayed on the liquid crystal display panel is fully displayed.

Figure 4A:
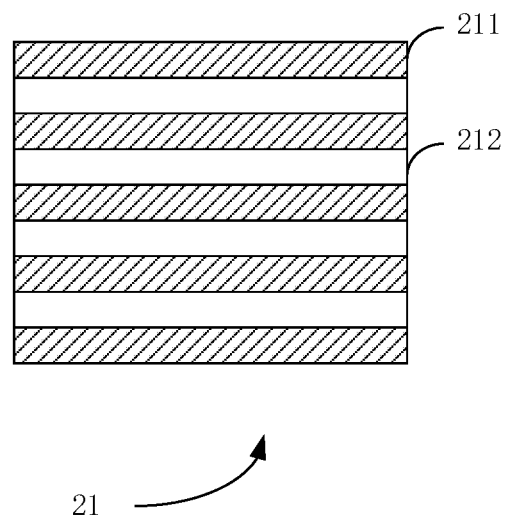
FIG. 4a is a schematic structural diagram of a second embodiment of one of at least two display layers of a liquid crystal display panel provided by the present disclosure.
Figure 4B:
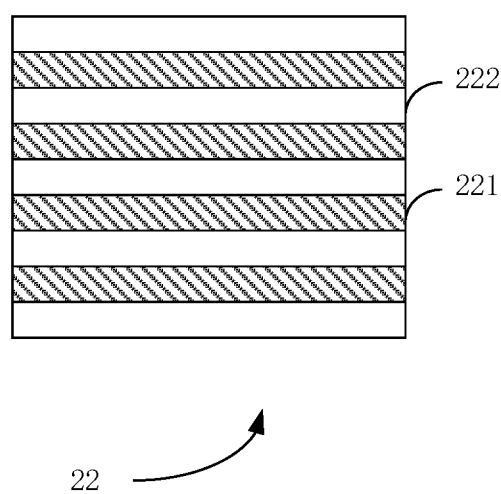
FIG. 4b is a schematic structural diagram of a second embodiment of the other one of at least two display layers of a liquid crystal display panel provided by the present disclosure.
Figure 5:
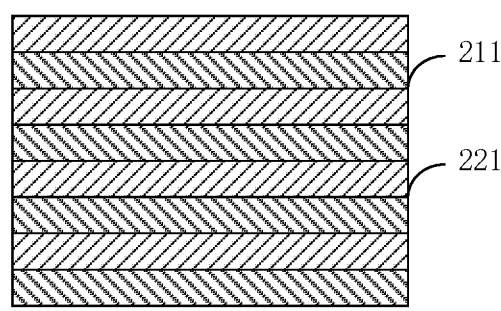
FIG. 5 is a schematic top view of a second embodiment of a liquid crystal display panel provided by the present disclosure.

Referring to FIG. 4a, FIG. 4b, and FIG. 5, FIG. 4a is a schematic structural diagram of a second embodiment of one of at least two display layers of a liquid crystal display panel provided by the present disclosure. FIG. 4b is a schematic structural diagram of a second embodiment of the other one of at least two display layers of a liquid crystal display panel provided by the present disclosure. FIG. 5 is a schematic top view of a second embodiment of a liquid crystal display panel provided by the present disclosure.

A liquid crystal display panel 20 comprises a display layer 21 and a display layer 22, the display layer 21 and the display layer 22 respectively comprises a liquid crystal layer, the liquid crystal layer of the display layer 21 comprises a plurality of pixel regions 211 and a plurality of non-pixel regions 212, the liquid crystal layer of the display layer 22 comprises a plurality of pixel regions 221 and a plurality of non-pixel regions 222, and positions of the plurality of pixel regions 211 and the plurality of pixel regions 221 are complementary in a light emitting direction of the liquid crystal display panel. In the present embodiment, the plurality of pixel regions 211 and the plurality of non-pixel regions 212 of the liquid crystal layer of the display layer 21 are disposed at intervals, and the plurality of pixel regions 221 and the plurality of non-pixel regions 222 of the liquid crystal layer of the display layer 22 are disposed at intervals. In other embodiments, the plurality of pixel regions 211 and the plurality of non-pixel regions 212 of the liquid crystal layer of the display layer 21 may not be disposed at intervals, and the plurality of pixel regions 221 and the plurality of non-pixel regions 222 of the liquid crystal layer of the display layer 22 may not be disposed at intervals. In the present embodiment, areas of the plurality of pixel regions 211 and the plurality of non-pixel regions 212 of the liquid crystal layer of the display layer 21 are equal, and areas of the plurality of pixel regions 221 and the plurality of non-pixel regions 222 of the liquid crystal layer of the display layer 22 are equal. In other embodiments, areas of the plurality of pixel regions 211 and the plurality of non-pixel regions 212 of the liquid crystal layer of the display layer 21 may be unequal, and areas of the plurality of pixel regions 221 and the plurality of non-pixel regions 222 of the liquid crystal layer of the display layer 22 may be unequal.

In the present embodiment, the liquid crystal display panel 20 comprises two display layers, display layer 21 and display layer 22 arranged in a stack. In other embodiments, the liquid crystal display panel comprises three or more display layers arranged in a stack.

It should be known from the above description that in the present embodiment, the present disclosure adopts at least two display layers arranged in a stack, and data signals of the at least two display layers are independently controlled. Therefore, pixel charging time of each of the display layers may be longer, which increases resolution limit of the liquid crystal display panel.

Figure 6:
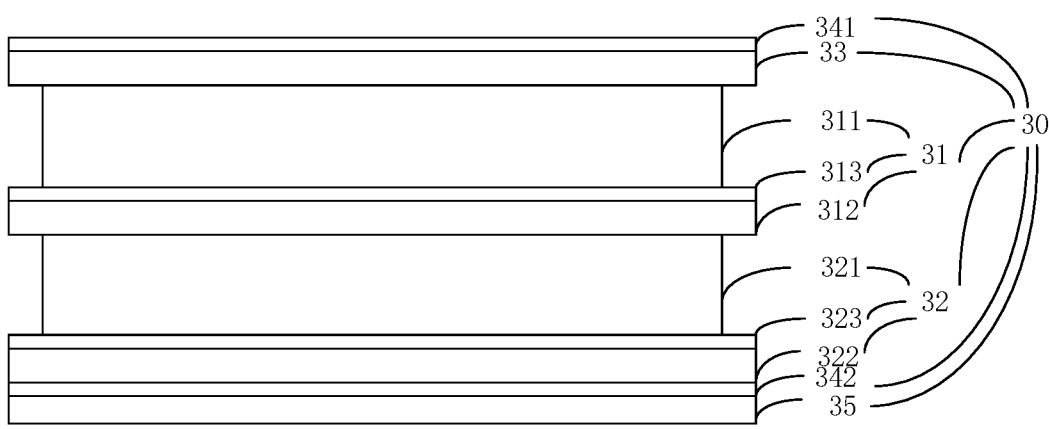
FIG. 6 is a schematic structural diagram of a third embodiment of a liquid crystal display panel provided by the present disclosure.

Referring to FIG. 6, FIG. 6 is a schematic structural diagram of a third embodiment of a liquid crystal display panel provided by the present disclosure. A liquid crystal display panel 30 comprises a display layer 31 and a display layer 32. Structures of the display layer 31 and 32 are same. The display layer 31 is used as an example for illustration herein. The display layer 31 comprises a liquid crystal layer 311, a first substrate 312, and an array layer 313. In the present embodiment, the first substrate 312 is a color filter substrate. In other embodiments, the first substrate 312 may be other substrates. The array layer 313 is disposed between the first substrate 312 and the liquid crystal layer 311. The display layer 32 comprises a liquid crystal layer 321, a first substrate 322, and an array layer 323. Alignment directions of the liquid crystal molecules in the liquid crystal layer 311 and the liquid crystal layer 321 are same, which may ensure that the display effect of the liquid crystal display panel 30 is consistent.

The liquid crystal display panel 30 further comprises a second substrate 33 disposed on a side of the liquid crystal layer 311 of the display layer 31 away from the array layer 313, a first polarizer 341 disposed on a side of the first substrate 33 away from the display layer 31, and a second polarizer 342 disposed a side of the first substrate 322 of the display layer 32 away from the first polarizer 341. A polarization direction of the first polarizer 341 is equal to a polarization direction of the first polarizer 342, which may ensure that the display effect of the liquid crystal display panel 30 is consistent.

The liquid crystal display panel 30 further comprises a backlight module 35 disposed on a side of the second polarizer 342 away from the first polarizer 341 and used for providing a light source required for the display of the liquid crystal display panel 30.

Data signals of the display layer 31 and the display layer 32 are independently controlled. Because the data signals of display layer 31 and display layer 32 are separately controlled, the number of scanning lines (gate lines) is reduced by half, and turn-on time of each pixel is double.

In the present embodiment, the liquid crystal display panel 30 comprises two display layers, display layer 31 and 32 arranged in a stack. In other embodiments, the liquid crystal display panel comprises three or more display layers arranged in a stack.

In the present embodiment, areas of the liquid crystal layer 311 and the liquid crystal layer 321 are slightly less than areas of other layers of the liquid crystal display panel 30.

It should be known from the above description that in the present embodiment, the present disclosure adopts at least two display layers disposed for display, and data signals of the at least two display layers are independently controlled. Therefore, pixel charging time of each of the display layers may be longer, which increases resolution limit of the liquid crystal display panel.

Figure 7:
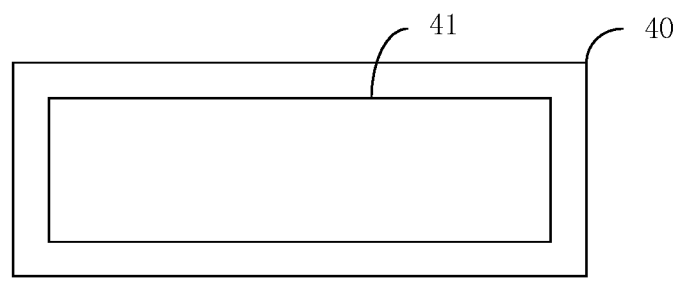
FIG. 7 is a schematic structural diagram of one embodiment of a display device provided by the present disclosure.

Referring to FIG. 7, FIG. 7 is a schematic structural diagram of one embodiment of a display device provided by the present disclosure. A display device 40 comprises a liquid crystal display panel 41, and the liquid crystal display panel 41 is a liquid crystal display panel as shown in any one of FIG. 1, FIG. 5, and FIG. 6.

It should be known from the above description that in the present embodiment, at least two display layers in the liquid crystal display panel included in the display device are disposed for display, and data signals of the at least two display layers are independently controlled. Therefore, pixel charging time of each of the display layers may be longer, which increases resolution limit of the liquid crystal display panel and improves viewing experience of the display device.

The present disclosure is different from the prior art, the present disclosure adopts at least two display layers arranged in a stack, and data signals of the at least two display layers are independently controlled. Therefore, pixel charging time of each of the display layers may be longer, which increases resolution limit of the liquid crystal display panel.

The above description is only embodiments of the present disclosure, and it does not limit the patent scope of the present disclosure. Any equivalent structure or equivalent process transformation using the contents of the specification and drawings of the present disclosure, or directly or indirectly used in other related technical fields, is equally included in the scope of patent protection of the present disclosure.

What is claimed is:

1. A liquid crystal display panel, comprising:
   at least two display layers arranged in a stack, wherein each of the display layers comprises a liquid crystal layer, an alignment direction of liquid crystal molecules in each of the liquid crystal layers is same, and each of the display layers comprises at least one pixel region and at least one non-pixel region;
   wherein a total coverage area of the at least one pixel region of the at least two display layers is equal to a display area of the liquid crystal display panel, and positions of the at least one pixel region of the at least two display layers are complementary in a light emitting direction of the liquid crystal display panel; and
   data signals of the at least two display layers are independently controlled;
   wherein an area of the at least one pixel region is equal to an area of the at least one non-pixel region.

2. A liquid crystal display panel, comprising:
   at least two display layers arranged in a stack, wherein each of display layers comprises a liquid crystal layer, and each of the display layers comprises at least one pixel region and at least one non-pixel region;
   wherein a total coverage area of the at least one pixel region of the at least two display layers is equal to a display area of the liquid crystal display panel; and
   data signals of the at least two display layers are independently controlled;
   wherein an area of the at least one pixel region is equal to an area of the at least one non-pixel region.

3. The liquid crystal display panel as claimed in claim 2, wherein positions of the at least one pixel region of the at least two display layers are complementary in a light emitting direction of the liquid crystal display panel.

4. The liquid crystal display panel as claimed in claim 2, wherein an alignment direction of liquid crystal molecules in each of the liquid crystal layers is same.

5. The liquid crystal display panel as claimed in claim 2, wherein the at least one pixel region and the at least one non-pixel region of each of the display layers are disposed at intervals.

6. The liquid crystal display panel as claimed in claim 2, wherein each of the display layers comprises:

a first substrate; and an array layer disposed between the first substrate and the liquid crystal layer.

7. The liquid crystal display panel as claimed in claim 2, wherein the liquid crystal display panel comprises:
   a second substrate disposed on a side of an uppermost layer of the display layers away from an array layer;
   a first polarizer disposed on a side of a first substrate away from the display layer; and
   a second polarizer disposed a side of a bottom layer of the display layers away from the first polarizer.

8. The liquid crystal display panel as claimed in claim 7, wherein a polarization direction of the first polarizer is same as a polarization direction of the second polarizer.

9. The liquid crystal display panel as claimed in claim 2, wherein the liquid crystal display panel comprises:
   a backlight module disposed on a side of a second polarizer away from a first polarizer.

10. A display device, comprising a liquid crystal display panel, wherein the liquid crystal display panel comprises:
    at least two display layers arranged in a stack, wherein each of the display layers comprises a liquid crystal layer, and each of the display layers comprises at least one pixel region and at least one non-pixel region;
    wherein a total coverage area of the at least one pixel region of the at least two display layers is equal to a display area of the liquid crystal display panel; and
    data signals of the at least two display layers are independently controlled;
    wherein an area of the at least one pixel region is equal to an area of the at least one non-pixel region.

11. The display device as claimed in claim 10, wherein positions of the at least one pixel region of the at least two display layers are complementary in a light emitting direction of the liquid crystal display panel.

12. The display device as claimed in claim 10, wherein an alignment direction of liquid crystal molecules in each of liquid crystal layers is same.

13. The display device as claimed in claim 10, wherein the at least one pixel region and the at least one non-pixel region of each of the display layers are disposed at intervals.

14. The display device as claimed in claim 10, wherein each of the display layers comprises:
    a first substrate; and an array layer disposed between the first substrate and the liquid crystal layer.

15. The display device as claimed in claim 10, wherein the liquid crystal display panel comprises:
    a second substrate disposed on a side of an uppermost layer of the display layers away from the array layer;
    a first polarizer disposed on a side of a first substrate away from the display layer; and
    a second polarizer disposed a side of a bottom layer of the display layers away from a first polarizer.

16. The display device as claimed in claim 15, wherein a polarization direction of the first polarizer is same as a polarization direction of the second polarizer.

17. The display device as claimed in claim 10, wherein the liquid crystal display panel comprises:
    a backlight module disposed on a side of a second polarizer away from a first polarizer.

* * * * *